United States Patent
Sakamoto et al.

(10) Patent No.: US 11,916,187 B2
(45) Date of Patent: Feb. 27, 2024

(54) MIXED IONIC AND ELECTRONIC CONDUCTOR FOR SOLID STATE BATTERY

(71) Applicant: THE REGENTS OF THE UNIVERSITY OF MICHIGAN, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 371 days.

(21) Appl. No.: 16/636,509

(22) PCT Filed: Aug. 7, 2018

(86) PCT No.: PCT/US2018/045508
§ 371 (c)(1),
(2) Date: Feb. 4, 2020

(87) PCT Pub. No.: WO2019/032514
PCT Pub. Date: Feb. 14, 2019

(65) Prior Publication Data
US 2020/0259211 A1  Aug. 13, 2020

Related U.S. Application Data

(60) Provisional application No. 62/542,010, filed on Aug. 7, 2017.

(51) Int. Cl.
*H01M 10/0562* (2010.01)
*H01M 10/0525* (2010.01)
(Continued)

(52) U.S. Cl.
CPC ..... *H01M 10/0562* (2013.01); *H01M 4/0471* (2013.01); *H01M 4/0485* (2013.01);
(Continued)

(58) Field of Classification Search
None
See application file for complete search history.

(56) References Cited

U.S. PATENT DOCUMENTS

2007/0259271 A1  11/2007 Nanno et al.
2009/0092903 A1  4/2009 Johnson et al.
(Continued)

FOREIGN PATENT DOCUMENTS

CN   102769147 A   11/2012
CN   103117413 A   5/2013
(Continued)

OTHER PUBLICATIONS

KR-A-140005393 Machine Translation.
(Continued)

*Primary Examiner* — Christopher P Domone
(74) *Attorney, Agent, or Firm* — Quarles & Brady LLP (57) ABSTRACT

Disclosed are electrochemical devices, such as lithium ion battery electrodes, lithium ion conducting solid-state electrolytes, and solid-state lithium ion batteries including these electrodes and solid-state electrolytes. Also disclosed are methods for making such electrochemical devices. Also disclosed are composite electrodes for solid state electrochemical devices. The composite electrodes include one or more separate phases within the electrode that provide electronic and ionic conduction pathways in the electrode active material phase.

31 Claims, 3 Drawing Sheets

(51) Int. Cl.
  *H01M 4/62* (2006.01)
  *H01M 4/38* (2006.01)
  *H01M 4/04* (2006.01)
  *H01M 4/525* (2010.01)
  *H01M 4/505* (2010.01)

(52) U.S. Cl.
  CPC ........... *H01M 4/382* (2013.01); *H01M 4/505* (2013.01); *H01M 4/525* (2013.01); *H01M 4/62* (2013.01); *H01M 10/0525* (2013.01); *H01M 2300/0074* (2013.01)

(56) References Cited

U.S. PATENT DOCUMENTS

| | | |
|---|---|---|
| 2011/0053001 A1 | 3/2011 | Babic et al. |
| 2012/0115039 A1 | 5/2012 | Ouchi et al. |
| 2012/0196189 A1 | 8/2012 | Babic et al. |
| 2015/0056520 A1 | 2/2015 | Thokchom et al. |
| 2015/0099188 A1 | 4/2015 | Holme et al. |
| 2015/0130115 A1 | 5/2015 | Sung et al. |
| 2016/0190636 A1 | 6/2016 | Mizuno et al. |
| 2016/0268629 A1* | 9/2016 | Tanaka ............... H01M 10/0562 |
| 2017/0125842 A1 | 5/2017 | Meguro et al. |
| 2017/0179472 A1 | 6/2017 | Allie et al. |
| 2017/0179522 A1* | 6/2017 | Choi ................. C04B 35/62218 |
| 2018/0205112 A1* | 7/2018 | Thomas-Alyea ... H01M 4/0404 |
| 2019/0036107 A1 | 1/2019 | Nagano |
| 2019/0051934 A1* | 2/2019 | Kim .................... H01M 10/052 |

FOREIGN PATENT DOCUMENTS

| | | |
|---|---|---|
| CN | 103594726 A | 2/2014 |
| JP | 2017-004783 A | 1/2017 |
| KR | 140005393 A | 1/2014 |
| KR | 20140005393 A | 1/2014 |
| WO | 2017/111131 A1 | 6/2017 |
| WO | 2018013517 A1 | 1/2018 |

OTHER PUBLICATIONS

JP 2017-004783A Machine Translation.
WO 2017/111131 A1 Machine Translation.
Buschmann et al., Structure and Dynamics of the Fast Lithium Ion Conductor "Li7La3Zr2O12", Phys. Chem. Chem. Phys., 2011, 13:19378-19392.
Miara et al., Effect of Rb and Ta Doping on the Ionic Conductivity and Stability of the Garnet Li7+2x-y(La3-xRbx) (Zr2-yTay)O12 ($0 \leq x \leq 0.375$, $0 \leq 6 \leq 1$) Superionic Conductor: A First Principles Investigation, Chemistry of Materials, 2013, 25(15):3048-3055.
Murugan et al., Fast Lithium Ion Conduction in Garnet-Type Li7La3Zr2O12, Angew. Chem. Int. Ed., 2007, 46:7778-7781.
NEI Corporation, Solid Electrolytes: Are We There Yet?, Battery News, White Papers, Apr. 10, 2017, 6 pages.
Rettenwander et al., Crystal Chemistry of "Li7La3Zr2O12" Garnet Doped with Al, Ga, and Fe: A Short Review on Local Structures as Revealed by NMR and Mößbauer Spectroscopy Studies, European Journal of Mineralogy, 2016, 28(3):619-629.
Thangadurai et al., Li6ALa2Ta2O12 (A = Sr, Ba): Novel Garnet-Like Oxides for Fast Lithium Ion Conduction, Advanced Functional Materials, 2005, 15(1):107-112.
Thangadurai et al., Recent Progress in Solid Oxide and Lithium Ion Conducting Electrolytes Research, Ionics, 2006, 12:81-92.
Thompson et al., A Tale of Two Sites: On Defining the Carrier Concentration in Garnet-Based Ionic Conductors for Advanced Li Batteries, Advanced Energy Materials, 2015, 1500096, 9 pages.
Wagner et al., Fast Li-Ion-Conducting Garnet-Related Li7-3xFexLa3Zr2O12 with Uncommon I $\bar{4}$3d Structure, Chemistry of Materials, 2016, 28(16):5943-5951.
Xu et al., Mechanisms of Li+ Transport in Garnet-Type Cubic Li3+xLa3M2O12 (M = Te, Nb, Zr), Physical Review B, 2012, 85:052301, 5 pages.
PCT International Search Report and Written Opinion, PCT/US2018/045508, dated Dec. 14, 2018, 16 pages.
Gao et al., Mechanism of Lithium Ion Diffusion in the Hexad Substituted Li7La3Zr2O12 Solid Electrolytes, Solid State Ionics, 2016, 291:1-7.
Wolfenstine et al., Synthesis and High Li-ion Conductivity of Ga-stabilized Cubic Li7La3Zr2O12, Materials Chemistry and Physics, 2012, 134(2-3):571-575.
European Patent Office, Extended Search Report, Application No. 18843565.5, dated Apr. 12, 2021, 10 pages.
CN103594726A Machine Translation.
CN103117413A Machine Translation.
CN102769147A Machine Translation.
KR20140005393A Machine Translation.
Sheng Yang et al., "Transition metal impurities in the solid electrolyte LLZO (Li7La3Zr2O12): Transport rates and their impact on Li-ion mobility," Abstract MAR17 Meeting of The American Physical Society (Nov. 11, 2016).

* cited by examiner

MIXED IONIC AND ELECTRONIC CONDUCTOR FOR SOLID STATE BATTERY

CROSS-REFERENCE TO RELATED APPLICATIONS

This application represents the national stage entry of PCT International Application No. PCT/US2018/045508 filed Aug. 7, 2018, which claims priority to U.S. Patent Application No. 62/542,010 filed Aug. 7, 2017, the contents of which are hereby incorporated herein by reference for all purposes.

STATEMENT REGARDING FEDERALLY SPONSORED RESEARCH

This invention was made with government support under grant DE-AR0000653 awarded by the Department of Energy. The government has certain rights in the invention.

BACKGROUND OF THE INVENTION

1. Field of the Invention

This invention relates to electrochemical devices, such as lithium ion battery electrodes, and solid-state lithium ion batteries including these electrodes and solid-state electrolytes. This invention also relates to methods for making such electrochemical devices. In particular, the invention relates to a composite electrode for a solid state electrochemical device wherein the electrode provides electronic and ionic conduction pathways in the electrode active material phase.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. One strategy is to develop solid state batteries, where the liquid electrolyte is replaced with a solid material that is conductive to $Li^+$ ions and can offer 3-4 times the energy density while reducing the battery pack cost by about 20%. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity >0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high lithium ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit lithium-ion conduction with the general formula $Li_{3+a}M_2Re_3O_{12}$ (where a=0-3, M=a metal with +4, +5, or +6 valence, and Re=a rare earth element with a +3 valence) [see, Xu, et al., *Phys. Rev. B* 2012, 85, 052301]. T. Thompson, A. Sharafi, M.D. Johannes, A. Huq, J. L. Allen, J. Wolfenstine, J. Sakamoto, *Advanced Energy Materials* 2015, 11, 1500096, identified which compositions, based on lithium content, exhibit maximal lithium-ion conductivity. LLZO is a particularly promising family of garnet compositions.

In a lithium-ion battery with a liquid electrolyte, a cast cathode electrode may comprise cathode particles, polymeric binder (typically polyvinylidene difluoride), and conductive additive (typically acetylene black). Electron transport occurs between the cathode particles by way of the conductive additive, and the cathode particles are wet by the liquid electrolyte that provides an ionic pathway for $Li^+$ ions to transport into the cathode particles. In a solid state battery, this cathode structure can be replaced with a composite cathode comprising a lithium ion conducting solid electrolyte for $Li^+$ transport, an oxide cathode active material phase, and an electronically conductive phase. The solid state composite cathode provides significant transport allowing for facile movement of ions and electrons to the cathode active material phase.

Thin film type LiPON (nitrogen doped lithium phosphate) batteries have been successfully produced with <10 micron cathode layers but at low areal loading. To produce all solid-state battery replacements for liquid electrolyte lithium-ion batteries with areal capacities of 1-5 $mAh/cm^2$, cathode layers must be up to 100 microns in thickness. Commonly used cathodes such as the layered type, olivine, or spinel, lack sufficient ionic and electronic conductivities to enable cathodes of this thickness.

What is needed therefore is a composite electrode with one or more separate phases within the electrode that provide electronic and ionic conduction pathways in the electrode active material phase.

SUMMARY OF THE INVENTION

The foregoing needs can be addressed by a solid-state electrolyte of the present disclosure. The solid-state electrolyte can be used in a composite cathode to provide for facile movement of ions and electrons to the electrode active material phase. The solid-state electrolyte comprises a conductive material comprising a ceramic material having a crystal structure and a dopant in the crystal structure. The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The ceramic material can comprise an oxide including lithium, lanthanum, and zirconium having a garnet-type or garnet-like crystal structure, and the dopant can be selected from the group consisting of transition metal ions and mixtures thereof. For example, transition metal doping of garnet LLZO phase can greatly increase electronic conductivity while ionic conductivity is minimally changed. Cobalt, in particular, readily dopes the LLZO structure and lends significant electronic conductivity.

In another aspect, the invention provides a composite electrode for an electrochemical device. The electrode may be a cathode or an anode. The electrode comprises a lithium host material having a structure (which may be porous); and a solid-state conductive electrolyte material of the present disclosure filling at least part (or all) of the structure.

In another aspect, the invention provides an electrochemical device, such as a lithium ion battery or a lithium metal battery. The electrochemical device comprises a cathode, an anode, and a solid-state electrolyte configured to facilitate the transfer of lithium ions between the anode and the cathode. The cathode can comprise a lithium host material having a first structure (which may be porous). The anode can comprise a lithium metal, or a lithium host material having a second structure (which may be porous). A solid-state conductive electrolyte material of the present disclosure fills at least part (or all) of the first structure in the lithium host material of the cathode and/or a second structure of the lithium host material of the anode (in the case of a lithium ion battery).

In one embodiment, the invention provides a method for forming a solid electrolyte material. In this method, a first solid comprising a lithium oxide or a lithium salt, a second solid comprising a lanthanum oxide or a lanthanum salt, and a third solid comprising a zirconium oxide or a zirconium salt, and a fourth solid comprising a transition metal, a transition metal oxide or a transition metal salt are combined to form a mixture. The mixture is calcined to form a solid electrolyte material having a lithium-ion conductivity and a solid electrolyte material electronic conductivity. In this method, the fourth solid is selected such that the solid electrolyte material electronic conductivity is greater than a reference electronic conductivity of a reference material having a formula of $Li_7La_3Zr_2O_{12}$.

In another embodiment, the invention provides a method for forming a solid electrolyte material. In this method, a first solid comprising a lithium oxide or a lithium salt, a second solid comprising a lanthanum oxide or a lanthanum salt, and a third solid comprising a zirconium oxide or a zirconium salt are combined. The mixture is calcined to form a ceramic material having a crystal structure. The crystal structure is doped with a transition metal ion to form a solid electrolyte material having a lithium-ion conductivity and a solid electrolyte material electronic conductivity. The transition metal ion is selected such that the solid electrolyte material electronic conductivity is greater than a reference electronic conductivity of a reference material having a formula of $Li_7La_3Zr_2O_{12}$.

In another embodiment, the invention provides a method for forming a composite electrode for an electrochemical device. In this method, a slurry is cast on a surface to form a layer, wherein the slurry comprises (i) a lithium host material, (ii) a ceramic material comprising an oxide including lithium, lanthanum, and zirconium, and having a garnet-type or garnet-like crystal structure, and (iii) a dopant comprising a transition metal, a transition metal oxide or a transition metal salt. The layer is sintered to form the electrode.

In another embodiment, the invention provides a method for forming a composite electrode for an electrochemical device. In this method, a slurry is cast on a surface to form a layer, wherein the slurry comprises a lithium host material. The layer is sintered to form an electrode active material having a porous structure therein; and at least part (or all) of the porous structure is filled with a solid-state conductive electrolyte material of the present disclosure. The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The ceramic material can be an oxide including lithium, lanthanum, and zirconium, the crystal structure can be a garnet-type or garnet-like crystal structure, and the dopant can be selected from the group consisting of transition metal ions and mixtures thereof.

In another embodiment, the invention provides a method for forming a composite electrode for an electrochemical device. In this method, a slurry is cast on a surface to form a layer. The slurry can comprise (i) a lithium host material comprising a lithium metal oxide including a transition metal ion, and (ii) a ceramic material comprising an oxide including lithium, lanthanum, and zirconium, and having a garnet-type or garnet-like crystal structure. The layer is sintered such that diffusion of the transition metal ion of the lithium metal oxide into the ceramic material provides a transition metal ion dopant in a crystal structure of sintered ceramic material of the electrode.

It is one advantage of the invention to provide an improved method for the fabrication of all solid-state batteries. Producing an all solid-state composite electrode is difficult due to chemical reactions during processing. The invention simplifies the composite electrode through chemical modification of a lithium-ion conducting solid electrolyte which gives significant electrical conductivity. $Li_7La_3Zr_2O_{12}$ (LLZO) is a promising solid-state electrolyte for solid-state batteries, which promise greatly increased energy density and safety over current state of the art lithium-ion batteries with a liquid electrolyte. Doping of the $Li_7La_3Zr_2O_{12}$ structure with transition metal ions, such as cobalt ions, gives LLZO significant electronic conduction. This mixed ionic/electronic conductor is an advantageous material for all solid-state battery electrodes, eliminating the need for a separate phase that provides an electrical pathway from the current collector to electrode active material particles.

These and other features, aspects, and advantages of the present invention will become better understood upon consideration of the following detailed description, drawings and appended claims.

DETAILED DESCRIPTION OF THE INVENTION

Figure 1:
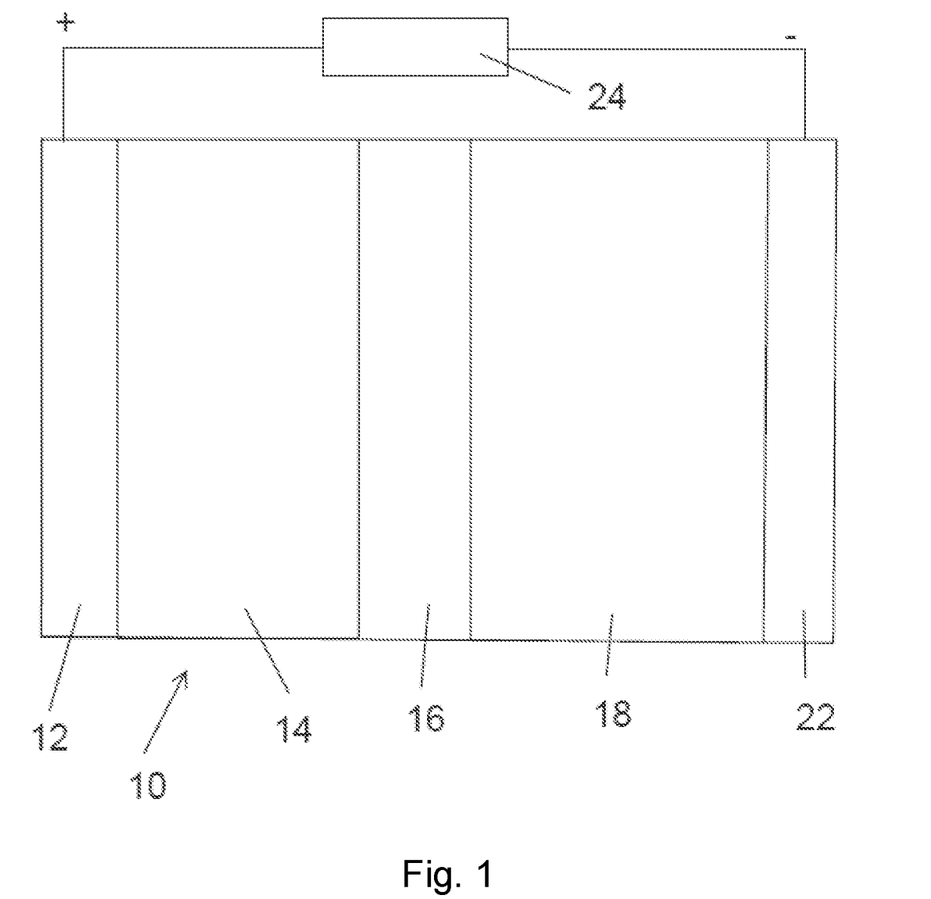
FIG. 1 is a schematic of a lithium ion battery.

In one non-limiting example application, an electrode according to embodiments of the invention can be used in a lithium ion battery as depicted in FIG. 1. The lithium ion battery 10 of FIG. 1 includes a current collector 12 (e.g., aluminum) in contact with a cathode 14. A solid state electrolyte 16 is arranged between the cathode 14 and an anode 18, which is in contact with a current collector 22 (e.g., aluminum). The current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more of aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

A suitable active material for the anode 18 of the lithium ion battery 10 is a lithium host material capable of incorporating and subsequently releasing the lithium ion such as graphite, a lithium metal oxide (e.g., lithium titanium oxide), hard carbon, a tin/cobalt alloy, or silicon/carbon. The anode active material can be a mixture of any number of these anode active materials.

A suitable solid state electrolyte 16 of the lithium ion battery 10 includes an electrolyte material having the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

can vary from 0-3;

w can vary from 0-2;

x is 0-2; and y can vary from 11-12.5.

In a non-limiting example embodiment of the invention, the electrolyte material has the chemical formula of $Li_{6.25}La_{2.7}Zr_2Al_{0.25}O_{12\pm\delta}$, wherein δ is 0.125.

Figure 2:
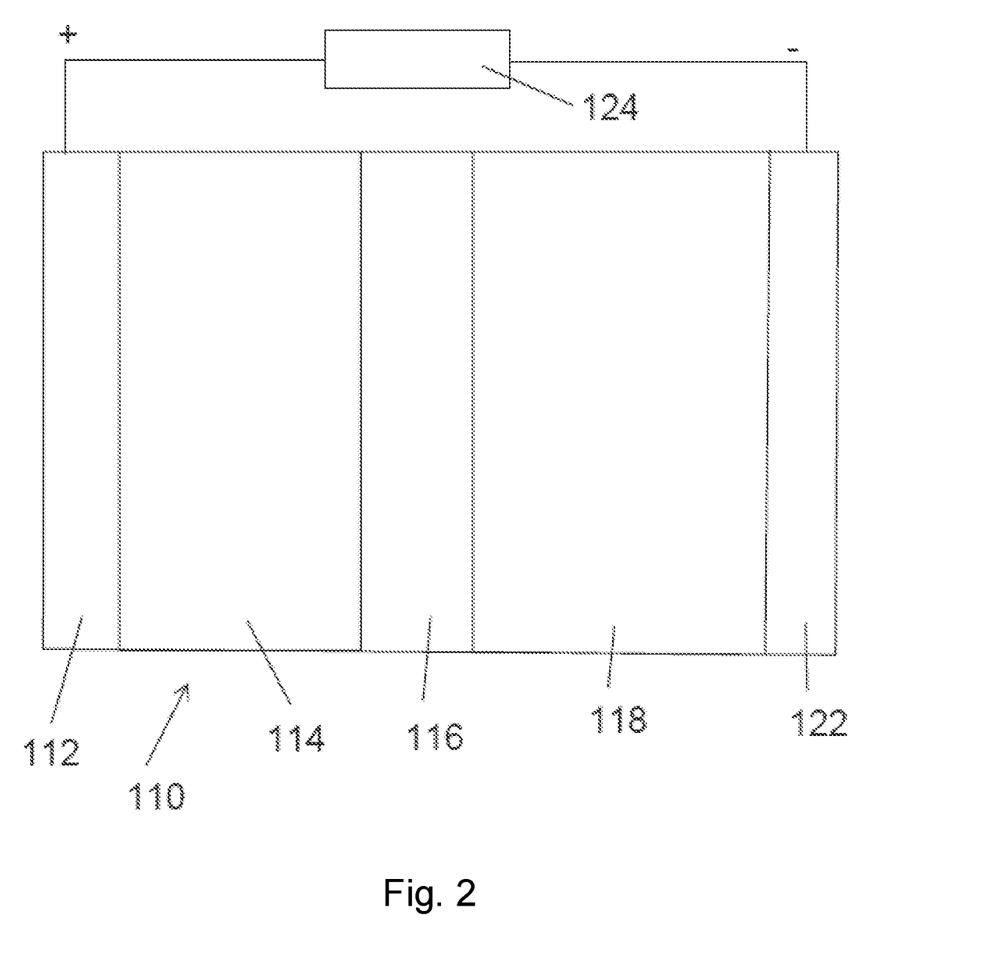
FIG. 2 is a schematic of a lithium metal battery.

In another non-limiting example application, an electrode according to embodiments of the invention can be used in a lithium metal battery as depicted in FIG. 2. The lithium metal battery 110 of FIG. 2 includes a current collector 112 in contact with a cathode 114. A solid state electrolyte 116 is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above, or porous carbon (for a lithium air battery), or a sulfur containing material (for a lithium sulfur battery). A suitable active material for the anode 118 of the lithium metal battery 110 is lithium metal. A suitable solid state electrolyte material for the solid state electrolyte 116 of the lithium metal battery 110 is one or more of the solid state electrolyte materials listed above.

The present invention provides embodiments of an electrode that provide improved electronic and ionic conduction pathways in the electrode active material phase (e.g., lithium host material) of a cathode or an anode suitable for use in the lithium ion battery 10 of FIG. 1 or the lithium metal battery 110 of FIG. 2.

Attractive solid-state electrolytes for the electrolyte layer in solid state batteries require ionic transference numbers approaching 1, i.e., high ionic transport and low electronic transport. LLZO is able to reach ionic transference numbers of 0.99999 [see, Buschmann et al., Physical Chemistry Chemical Physics 2011, 13, 19378]. However, within an all solid state composite electrode (e.g., cathode), it is desirable to use a solid-state conductive material that has an ionic transference number less than 1, such that the solid-state conductive material also has appreciable electronic conductivity, also known as a mixed ionic electronic conductor.

Figure 3:
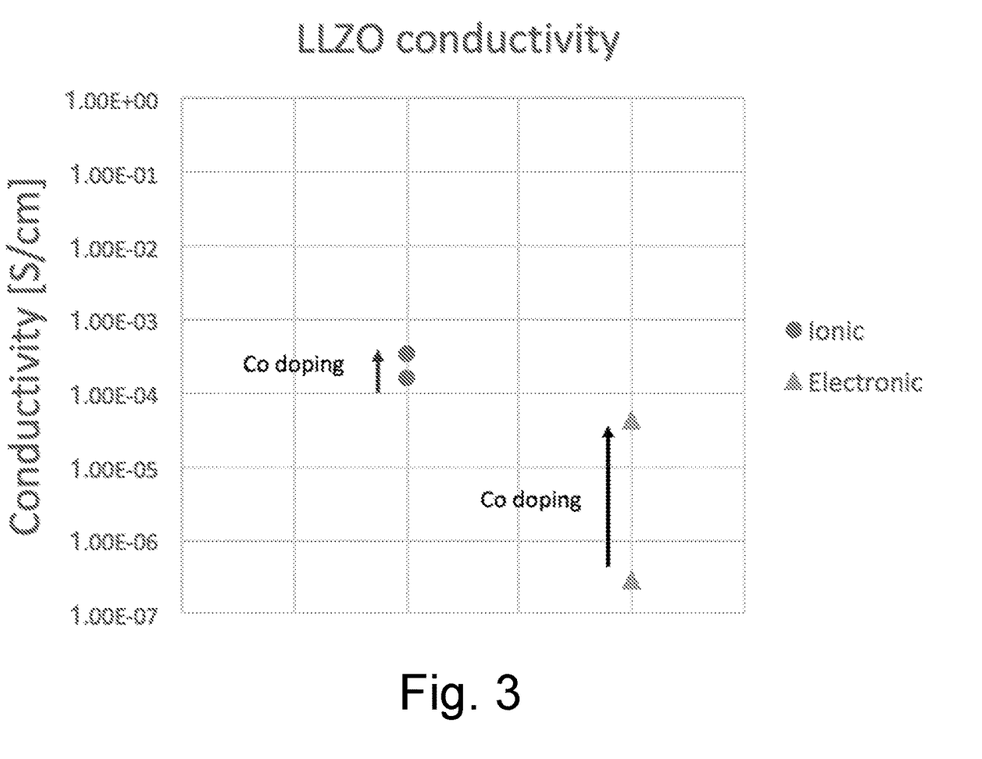
FIG. 3 is a graph showing electronic and ionic conductivities of $Li_7La_3Zr_2O_{12}$ (LLZO) before and after doping with cobalt (Co).

Transition metal doping of garnet LLZO phase can greatly increase electronic conductivity while ionic conductivity is minimally changed. Cobalt, in particular, readily dopes the LLZO structure and lends significant electronic conductivity, as shown in FIG. 3. In FIG. 3, undoped $Li_7La_3Zr_2O_{12}$ (LLZO) has the lower ionic conductivity and the lower electronic conductivity values. In FIG. 3, the doping was with about 0.3 wt. % $Co_3O_4$ in the LLZO as measured by an X-ray fluorescence analyzer (XRF). The 0.3 wt. % $Co_3O_4$ doping in the LLZO resulted in the higher ionic conductivity and the higher electronic conductivity values shown in FIG. 3.

Cobalt doped LLZO can be produced by direct solid state reaction of cobalt oxides or cobalt metal and LLZO during synthesis. Additionally, cobalt doped LLZO can be generated in-situ by co-sintering cobalt containing cathode materials such as $LiCoO_2$, lithium nickel manganese cobalt oxide (NMC), or lithium nickel cobalt aluminum oxide (NCA). In another embodiment, cobalt is diffused into the LLZO at a temperature (e.g., 600-1000° C.) from cobalt or cobalt oxide species in the gas phase. Although cobalt is used as an example, it is expected that other dopants including transition metals can similarly increase the electronic conductivity while minimally changing the ionic conductivity.

Solid-State Electrolyte

In one embodiment, the invention provides a solid-state electrolyte for an electrochemical device. The solid-state electrolyte can be used in a composite cathode to provide for facile movement of ions and electrons to the electrode active material phase. The solid-state electrolyte comprises a conductive material comprising a ceramic material having a crystal structure and a dopant in the crystal structure. The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The ceramic material can comprise an oxide including lithium, lanthanum, and zirconium having a garnet-type or garnet-like crystal structure, and the dopant can be selected from the group consisting of transition metal ions and mixtures thereof. The dopant may be present in the crystal structure at 0.05 to 3 weight percent based on a total weight of the chemical elements in the crystal structure, or the dopant may be present in the crystal structure at greater than 0.01 weight percent based on a total weight of the chemical elements in the crystal structure, or the dopant may be present in the crystal structure at 0.1 to 1 weight percent based on a total weight of the chemical elements in the crystal structure, or the dopant may be present in the crystal structure at 0.05 to 1.5 weight percent based on a total weight of the chemical elements in the crystal structure. For example, transition metal doping of garnet LLZO phase can greatly increase electronic conductivity while ionic conductivity is minimally changed. Cobalt, in particular, readily dopes the LLZO structure and lends significant electronic conductivity. The transition metal dopant (e.g., cobalt) may be from any appropriate transition metal containing source.

The solid-state electrolyte can have a lithium-ion conductivity greater than $10^{-5}$ S/cm, and preferably greater than $10^{-4}$ S/cm. The solid-state electrolyte can have an electronic conductivity greater than $10^{-6}$ S/cm, preferably greater than $10^{-5}$ S/cm, and more preferably greater than $10^{-4}$ S/cm.

The ceramic material of the solid-state electrolyte can have a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75, and
wherein z is 10.875-13.125.

In one non-limiting example, the ceramic material has the formula $Li_7La_3Zr_2O_{12}$. In another non-limiting example, the ceramic material has the formula $Li_{6.25}La_{2.7}Zr_2Al_{0.25}O_{12\pm\delta}$, wherein δ is 0.125.

In the solid-state electrolyte, the dopant can be selected from the group consisting of ions of Co, Mn, Cr, V, Ti, Mo, Ni, Cu, Zn, W, Bi, Sn, Pb, Cd, Sc, Y, Mg, Ca, Sr, Ba, Fe, and mixtures thereof. In one non-limiting example, the dopant comprises cobalt ions.

Composite Electrodes

In another embodiment, the invention provides a composite electrode for an electrochemical device. The electrode may be a cathode or an anode. The electrode comprises a lithium host material having a structure (which may be porous); and a solid-state conductive material comprising a ceramic material having a crystal structure and a dopant in the crystal structure. The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The conductive material fills at least part (or all) of the structure of the electrode. The ceramic material of the solid-state conductive material of the electrode can comprise an oxide including lithium, lanthanum, and zirconium having a garnet-type or garnet-like crystal structure, and the dopant can be selected from the group consisting of transition metal ions and mixtures thereof. The dopant may be present in the crystal structure at 0.05 to 3 weight percent based on a total weight of the chemical elements in the crystal structure, or the dopant may be present in the crystal structure at greater than 0.01 weight percent based on a total weight of the chemical elements in the crystal structure, or the dopant may be present in the crystal structure at 0.1 to 1 weight percent based on a total weight of the chemical elements in the crystal structure, or the dopant may be present in the crystal structure at 0.05 to 1.5 weight percent based on a total weight of the chemical elements in the crystal structure. For example, transition metal doping of garnet LLZO phase can greatly increase electronic conductivity while ionic conductivity is minimally changed. Cobalt, in particular, readily dopes the LLZO structure and lends significant electronic conductivity. The transition metal dopant (e.g., cobalt) may be from any appropriate transition metal containing source.

The solid-state conductive material of the electrode can have a lithium-ion conductivity greater than $10^{-5}$ S/cm, and preferably greater than $10^{-4}$ S/cm. The solid-state conductive material of the electrode can have an electronic conductivity greater than $10^{-6}$ S/cm, preferably greater than $10^{-5}$ S/cm, and more preferably greater than $10^{-4}$ S/cm.

The ceramic material of the solid-state conductive material of the electrode can have a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75, and
wherein z is 10.875-13.125.

In one non-limiting example, the ceramic material of the solid-state conductive material of the electrode has the formula $Li_7La_3Zr_2O_{12}$. In another non-limiting example, the ceramic material of the solid-state conductive material of the electrode has the formula $Li_{6.25}La_{2.7}Zr_2Al_{0.25}O_{12\pm\delta}$, wherein δ is 0.125.

In the solid-state conductive material of the electrode, the dopant can be selected from the group consisting of ions of Co, Mn, Cr, V, Ti, Mo, Ni, Cu, Zn, W, Bi, Sn, Pb, Cd, Sc, Y, Mg, Ca, Sr, Ba, Fe, and mixtures thereof. In one non-limiting example, the dopant comprises cobalt ions.

Electrochemical Devices

In one embodiment, the invention provides an electrochemical device, such as the lithium ion battery 10 of FIG. 1 or the lithium metal battery 110 of FIG. 2. The electrochemical device comprises a cathode, an anode, and a solid-state electrolyte configured to facilitate the transfer of ions between the anode and the cathode. The cathode can comprise a lithium host material having a first structure (which may be porous). The anode can comprise a lithium metal, or a lithium host material having a second structure (which may be porous).

In the electrochemical device, a solid-state conductive material comprising a ceramic material having a crystal structure and a dopant in the crystal structure fills at least part (or all) of the first structure in the lithium host material of the cathode and/or a second structure of the lithium host material of the anode (in the case of a lithium ion battery). Typically, the lithium host materials are sintered.

The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The ceramic material of the solid-state conductive material of one or both of the electrode(s) of the electrochemical device can comprise an oxide including lithium, lanthanum, and zirconium having a garnet-type or garnet-like crystal structure, and the dopant can be selected from the group consisting of transition metal ions and mixtures thereof. The dopant may be present in the crystal structure at 0.05 to 3 weight percent based on a total weight of the chemical elements in the crystal structure, or the dopant may be present in the crystal structure at greater than 0.01 weight percent based on a total weight of the chemical elements in the crystal structure, or the dopant may be present in the crystal structure at 0.1 to 1 weight percent based on a total weight of the chemical elements in the crystal structure, or the dopant may be present in the crystal structure at 0.05 to 1.5 weight percent based on a total weight of the chemical elements in the crystal structure. For example, transition metal doping of garnet LLZO phase can greatly increase electronic conductivity while ionic conductivity is minimally changed. Cobalt, in particular, readily dopes the LLZO structure and lends significant electronic conductivity. The transition metal dopant (e.g., cobalt) may be from any appropriate transition metal containing source.

The solid-state conductive material of one or both of the electrodes of the electrochemical device can have a lithium-ion conductivity greater than $10^{-5}$ S/cm, and preferably greater than $10^{-4}$ S/cm. The solid-state conductive material of one or both of the electrodes of the electrochemical device can have an electronic conductivity greater than $10^{-6}$ S/cm, preferably greater than $10^{-5}$ S/cm, and more preferably greater than $10^{-4}$ S/cm.

The ceramic material of the solid-state conductive material of one or both of the electrodes of the electrochemical device can have a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75, and
wherein z is 10.875-13.125.

In one non-limiting example, the ceramic material of the solid-state conductive material of one or both of the electrode(s) of the electrochemical device has the formula $Li_7La_3Zr_2O_{12}$. In another non-limiting example, the ceramic material of the solid-state conductive material of one or both of the electrodes of the electrochemical device has the formula $Li_{6.25}La_{2.7}Zr_2Al_{0.25}O_{12\pm\delta}$, wherein $\delta$ is 0.125.

In the solid-state conductive material of one or both of the electrodes of the electrochemical device, the dopant can be selected from the group consisting of ions of Co, Mn, Cr, V, Ti, Mo, Ni, Cu, Zn, W, Bi, Sn, Pb, Cd, Sc, Y, Mg, Ca, Sr, Ba, Fe, and mixtures thereof. In one non-limiting example, the dopant comprises cobalt ions.

The lithium host material of the cathode of the electrochemical device can be selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. The lithium host material of the cathode of the electrochemical device can be selected from the group consisting of lithium cobalt oxides. The lithium host material of the cathode of the electrochemical device can be selected from the group consisting of lithium nickel manganese cobalt oxides. The lithium host material of the cathode of the electrochemical device can be selected from the group consisting of lithium nickel cobalt aluminum oxides.

The lithium host material of the anode of the electrochemical device (in the case of a lithium ion battery) can be selected from the group consisting of graphite, lithium metal, lithium titanium oxides, hard carbon, tin/cobalt alloy, or silicon/carbon. In a lithium metal battery, the anode comprises lithium metal.

The solid-state electrolyte facilitating the transfer of ions between the anode and the cathode of the electrochemical device can comprise a solid electrolyte material selected from the group consisting of any combination oxide or phosphate materials with the garnet, perovskite, NaSICON, and LiSICON phase or polymers. The solid electrolyte material can have has a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the crystal structure is a garnet-type or garnet-like crystal structure.

The cathode and the anode of the electrochemical device can comprise a current collector configured to place the electrochemical device in electrical communication with an electrical load that discharges the battery or a charger that charges the battery.

Methods for Forming a Solid Electrolyte Material

In one embodiment, the invention provides a method for forming a solid electrolyte material. In this method, a first solid comprising a lithium oxide or a lithium salt, a second solid comprising a lanthanum oxide or a lanthanum salt; and a third solid comprising a zirconium oxide or a zirconium salt and a fourth solid comprising a transition metal, a transition metal oxide or a transition metal salt are combined to form a mixture. The mixture is calcined, preferably at a temperature from 400° C. to 1200° C., to form a solid electrolyte material having a lithium-ion conductivity and a solid electrolyte material electronic conductivity. In this method, the fourth solid is selected such that the solid electrolyte material electronic conductivity is greater than a reference electronic conductivity of a reference material having a formula of $Li_7La_3Zr_2O_{12}$.

The fourth solid can comprises a transition metal, and the transition metal can be selected from the group consisting of Co, Mn, Cr, V, Ti, Mo, Ni, Cu, Zn, W, Bi, Sn, Pb, Cd, Sc, Y, Mg, Ca, Sr, Ba, Fe, and mixtures thereof. The fourth solid can comprise a transition metal oxide, and the transition metal oxide can be selected from the group consisting of oxides of Co, Mn, Cr, V, Ti, Mo, Ni, Cu, Zn, W, Bi, Sn, Pb, Cd, Sc, Y, Mg, Ca, Sr, Ba, Fe, and mixtures thereof. The fourth solid can comprise a transition metal salt, and the transition metal salt can be selected from the group consisting of salts of Co, Mn, Cr, V, Ti, Mo, Ni, Cu, Zn, W, Bi, Sn, Pb, Cd, Sc, Y, Mg, Ca, Sr, Ba, Fe, and mixtures thereof. The fourth solid can comprise cobalt oxide or cobalt metal.

In another embodiment, the invention provides a method for forming a solid electrolyte material. In this method, a first solid comprising a lithium oxide or a lithium salt, a second solid comprising a lanthanum oxide or a lanthanum salt; and a third solid comprising a zirconium oxide or a zirconium salt are combined. The mixture is calcined, preferably at a temperature from 400° C. to 1200° C., to form a ceramic material having a crystal structure. The crystal structure is doped with a transition metal ion to form a solid electrolyte material having a lithium-ion conductivity and a solid electrolyte material electronic conductivity. The transition metal ion is selected such that the solid electrolyte material electronic conductivity is greater than a reference electronic conductivity of a reference material having a formula of $Li_7La_3Zr_2O_{12}$.

The ceramic material of this method can have a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, Co, Fe, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the crystal structure is a garnet-type or garnet-like crystal structure.

In one version of this method, the transition metal ion is diffused into the crystal structure using gas phase transport from a solid comprising a transition metal, a transition metal oxide or a transition metal salt. The transition metal can be selected from the group consisting of Co, Mn, Cr, V, Ti, Mo, Ni, Cu, Zn, W, Bi, Sn, Pb, Cd, Sc, Y, Mg, Ca, Sr, Ba, Fe, and mixtures thereof, and the transition metal oxide can be selected from the group consisting of oxides of Co, Mn, Cr, V, Ti, Mo, Ni, Cu, Zn, W, Bi, Sn, Pb, Cd, Sc, Y, Mg, Ca, Sr, Ba, Fe, and mixtures thereof, and the transition metal salt can be selected from the group consisting of salts of Co, Mn, Cr, V, Ti, Mo, Ni, Cu, Zn, W, Bi, Sn, Pb, Cd, Sc, Y, Mg, Ca, Sr, Ba, Fe, and mixtures thereof. In one version of this method, one or more cobalt ions are diffused into the crystal structure using gas phase transport from a powder comprising a cobalt metal, a cobalt oxide or a cobalt salt.

Methods for Forming a Composite Electrode

In one embodiment, the invention provides a method for forming a composite electrode for an electrochemical device. In this method, a slurry is cast on a surface to form a layer, wherein the slurry comprises (i) a lithium host material, (ii) a ceramic material comprising an oxide including lithium, lanthanum, and zirconium, and having a garnet-type or garnet-like crystal structure, and (iii) a dopant comprising a transition metal, a transition metal oxide or a transition metal salt. The layer is sintered, preferably at a temperature from 400° C. to 1200° C., to form the electrode.

In this method, the lithium host material, typically for a cathode, can be selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. The lithium host material, typically for a cathode, can be selected from the group consisting of lithium cobalt oxides. The lithium host material, typically for a cathode, can be selected from the group consisting of lithium nickel manganese cobalt oxides. The lithium host material, typically for a cathode, can be selected from the group consisting of lithium nickel cobalt aluminum oxides. The lithium host material, typically for an anode, can be selected from the group consisting of graphite, lithium metal, lithium titanium oxides, hard carbon, tin/cobalt alloy, or silicon/carbon.

For the dopant of this method, the transition metal can be selected from the group consisting of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal oxide can be selected from the group consisting of oxides of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal salt can be selected from the group consisting of salts of Co, Mn, Cr, V, Ti, Mo, Ni, Cu, Zn, W, Bi, Sn, Pb, Cd, Sc, Y, Mg, Ca, Sr, Ba, Fe, and mixtures thereof. The dopant can provide cobalt ions in a crystal structure of the ceramic material.

In this method, the ceramic material can have a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, Co, Fe, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the crystal structure is a garnet-type or garnet-like crystal structure.

In another embodiment, the invention provides a method for forming a composite electrode for an electrochemical device. In this method, a slurry is cast on a surface to form a layer, wherein the slurry comprises a lithium host material. The layer is sintered, preferably at a temperature from 400° C. to 1200° C., to form an electrode active material having a porous structure therein; and at least part (or all) of the porous structure is filled with a solid-state conductive material comprising a ceramic material having a crystal structure and a dopant in the crystal structure. The conductive material has a lithium-ion conductivity and a conductive material electronic conductivity wherein the conductive material electronic conductivity is greater than a reference electronic conductivity of a reference material comprising the ceramic material having the crystal structure without the dopant in the crystal structure. The ceramic material can be an oxide including lithium, lanthanum, and zirconium, the crystal structure can be a garnet-type or garnet-like crystal structure, and the dopant can be selected from the group consisting of transition metal ions and mixtures thereof.

In this method, the lithium host material, typically for a cathode, can be selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. The lithium host material, typically for a cathode, can be selected from the group consisting of lithium cobalt oxides. The lithium host material, typically for a cathode, can be selected from the group consisting of lithium nickel manganese cobalt oxides. The lithium host material, typically for a cathode, can be selected from the group consisting of lithium nickel cobalt aluminum oxides. The lithium host material, typically for an anode, can be selected from the group consisting of graphite, lithium metal, lithium titanium oxides, hard carbon, tin/cobalt alloy, or silicon/carbon.

For the dopant of this method, the transition metal can be selected from the group consisting of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal oxide can be selected from the group consisting of oxides of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal salt can be selected from the group consisting of salts of Co, Mn, Cr, V, Ti, Mo, Ni, Cu, Zn, W, Bi, Sn, Pb, Cd, Sc, Y, Mg, Ca, Sr, Ba, Fe, and mixtures thereof. The dopant can provide cobalt ions in a crystal structure of the ceramic material.

In this method, the ceramic material can have a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the crystal structure is a garnet-type or garnet-like crystal structure.

In this method, the transition metal ion can be diffused into the crystal structure using gas phase transport from a solid comprising a transition metal, a transition metal oxide or a transition metal salt. The diffusion step can comprise diffusing one or more cobalt ions into the crystal structure using gas phase transport from a powder comprising a cobalt metal, a cobalt oxide or a cobalt salt.

In another embodiment, the invention provides a method for forming a composite electrode for an electrochemical device. In this method, a slurry is cast on a surface to form a layer. The slurry can comprise (i) a lithium host material comprising a lithium metal oxide including a transition metal ion, and (ii) a ceramic material comprising an oxide including lithium, lanthanum, and zirconium, and having a garnet-type or garnet-like crystal structure. The layer is sintered, preferably at a temperature from 400° C. to 1200° C., such that diffusion of the transition metal ion of the lithium metal oxide into the ceramic material provides a transition metal ion dopant in a crystal structure of sintered ceramic material of the electrode.

In this method, the lithium host material, typically for a cathode, can be selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel. The lithium host material, typically for a cathode, can be selected from the group consisting of lithium cobalt oxides. The lithium host material, typically for a cathode, can be selected from the group consisting of lithium nickel manganese cobalt oxides. The lithium host material, typically for a cathode, can be selected from the group consisting of lithium nickel cobalt aluminum oxides. The lithium host material, typically for an anode, can be selected from the group consisting of graphite, lithium metal, lithium titanium oxides, hard carbon, tin/cobalt alloy, or silicon/carbon.

For the dopant of this method, the transition metal can be selected from the group consisting of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal oxide can be selected from the group consisting of oxides of Co, Mn, Cr, V, Ti, Mo, Ni, Cu, Zn, W, Bi, Sn, Pb, Cd, Sc, Y, Mg, Ca, Sr, Ba, Fe, and mixtures thereof, or the transition metal salt can be selected from the group consisting of salts of Co, Mn, Cr, V, Ti, Mo, Ni, Cu, Zn, W, Bi, Sn, Pb, Cd, Sc, Y, Mg, Ca, Sr, Ba, Fe, and mixtures thereof. The dopant can provide cobalt ions in a crystal structure of the ceramic material.

In this method, the ceramic material can have a formula of $Li_wA_xM_2Re_{3-y}O_z$ wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the crystal structure is a garnet-type or garnet-like crystal structure.

In any of the methods for forming a composite electrode, the slurry to be cast may include optional components. For example, the slurry may optionally include one or more sintering aids which melt and form a liquid that can assist in sintering of a cast slurry formulation of the invention via liquid phase sintering. Example sintering aids can be selected from boric acid, boric acid salts, boric acid esters, boron alkoxides phosphoric acid, phosphoric acid salts, phosphate acid esters, silicic acid, silicic acid salts, silanols, silicon alkoxides, aluminum alkoxides and mixtures thereof.

The slurry may optionally include a dispersant. One purpose of the dispersant is to stabilize the slurry and prevent the suspended active battery material particles from settling out. The dispersant may be selected from the group consisting of salts of lithium and a fatty acid. The fatty acid may be selected from lauric acid, myristic acid, palmitic acid, stearic acid, oleic acid, linoleic acid, linolenic acid, arachidic acid, and behenic acid.

The slurry may optionally include a plasticizer. The purpose of the plasticizer is to increase the workability of the as-cast tape. Preferably, the plasticizer is a naturally derived plant based oil. The plasticizer may be selected from the group consisting of coconut oil, castor oil, soybean oil, palm kernel oil, almond oil, corn oil, canola oil, rapeseed oil, and mixtures thereof.

The slurry formulation may optionally include a binder. Non-limiting examples of the binder include: poly(methylmethacrylate), poly(vinylacetate), polyvinyl alcohol, polyethyleneoxide, polyvinylpyrrolidone, polyvinyl ether, polyvinylchloride, polyacrylonitrile, polyvinylpyridine, styrene-butadiene rubber, acrylonitrile-butadiene rubber, polyethylene, polypropylene, ethylene-propylene-diene terpolymers (EPDM), cellulose, carboxymethylcellulose, starch, hydroxypropylcellulose, and mixtures thereof. The binder is preferably a non-fluorinated polymeric material.

The slurry may optionally include a solvent is useful in a slurry formulation to dissolve the binder and act as a medium for mixing the other additives. Any suitable solvents may be used for mixing the active battery material particles, dispersant, and binder into a uniform slurry. Suitable solvents may include alkanols (e.g., ethanol), nitriles (e.g., acetonitrile), alkyl carbonates, alkylene carbonates (e.g., propylene carbonate), alkyl acetates, sulfoxides, glycol ethers, ethers, N-methyl-2-pyrrolidone, dimethylformamide, dimethylacetamide, tetrahydrofuran, or a mixture of any of these solvents.

The slurry formulation may include other additives. For example, the cathode or anode active battery material particles may be mixed with other particles, such as conductive particles. Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as aluminum powder and nickel powder; conductive whiskers such as zinc oxide and potassium titanate; conductive metal oxides such as titanium oxide; and polyphenylene derivatives.

Any suitable method may be used to mix the slurry components into a uniform slurry. Suitable mixing methods may include sonication, mechanical stirring, physical shaking, vortexing, ball milling, and any other suitable means.

After the uniform slurry is obtained, the formulation is cast on a substrate surface to form a cast tape layer. The substrate may include any stable and conductive metals suitable as a current collector for the battery. A suitable metallic substrate may include aluminum, copper, silver, iron, gold, nickel, cobalt, titanium, molybdenum, steel, zirconium, tantalum, and stainless steel. In one embodiment, the metal substrate is aluminum.

The slurry layer cast on the surface may have a thickness in the range of a few micrometers to a few centimeters. In one embodiment, the thickness of the cast slurry layer is in the range of 10 micrometers to 150 micrometers, preferably 10 micrometers to 100 micrometers. After the slurry is cast on the substrate surface to form a tape, the green tape can be dried and sintered to a composite electrode having a thickness in the range of 10 micrometers to 150 micrometers, preferably 20 micrometers to 100 micrometers, more preferably 50 micrometers to 100 micrometers. Optionally, multiple layers can be cast on top of one another. For example, the anode can be cast first on the metal substrate, followed by casting the solid electrolyte on the anode, and finally casting the cathode on the electrolyte. Alternatively, the cathode can be cast first on the metal substrate, followed by the solid electrolyte, and finally the anode. The multi-layer green tape can be dried and sintered to achieve the necessary electrochemical properties.

Thus, the invention provides electrochemical devices, such as lithium ion battery composite electrodes, and solid-state lithium ion batteries including these composite electrodes and solid-state electrolytes. The composite electrodes include one or more separate phases within the electrode that provide electronic and ionic conduction pathways in the electrode active material phase. The solid state electrochemical devices have applications in electric vehicles, consumer electronics, medical devices, oil/gas, military, and aerospace.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An electrode for an electrochemical device, the electrode comprising:
   a lithium host material phase; and
   a solid-state conductive material phase comprising a ceramic material having a crystal structure and a dopant in the crystal structure, the conductive material phase having a lithium-ion conductivity and a conductive material electronic conductivity wherein the conductive material electronic conductivity is greater than a reference electronic conductivity of a reference material comprising the ceramic material having the crystal structure without the dopant in the crystal structure, the conductive material phase filling at least part of a structure of the lithium host material phase,
   wherein the dopant is selected from the group consisting of transition metal ions and mixtures thereof, and
   wherein the electrode does not include a separate phase, other than the lithium host material phase and the solid-state conductive material phase, that provides an electrical pathway from a current collector to the lithium host material phase.

2. The electrode of claim 1 wherein:
   the ceramic material comprises an oxide including lithium, lanthanum, and zirconium, and
   the crystal structure is a garnet-type or garnet-like crystal structure.

3. The electrode of claim 1 wherein:
   the lithium-ion conductivity is greater than $10^{-5}$ S/cm.

4. The electrode of claim 1 wherein:
   the dopant is present in the crystal structure at 0.05 to 3 weight percent based on a total weight of chemical elements in the crystal structure.

5. The electrode of claim 1 wherein:
   the conductive material electronic conductivity is greater than $10^{-6}$ S/cm.

6. The electrode of claim 1 wherein:
   the conductive material electronic conductivity is greater than $10^{-4}$ S/cm.

7. The electrode of claim 1 wherein:
   the ceramic material has a formula of $Li_wA_xM_2Re_{3-y}O_z$
   wherein w is 5-7.5,
   wherein A is selected from B, Al, Ga, In, Zn, Cd, Y, Sc, Mg, Ca, Sr, Ba, Co, Fe, and any combination thereof,
   wherein x is 0-2,
   wherein M is selected from Zr, Hf, Nb, Ta, Mo, W, Sn, Ge, Si, Sb, Se, Te, and any combination thereof,
   wherein Re is selected from lanthanide elements, actinide elements, and any combination thereof,
   wherein y is 0-0.75, and
   wherein z is 10.875-13.125.

8. The electrode of claim 1 wherein:
   the ceramic material has the formula $Li_7La_3Zr_2O_{12}$.

9. The electrode of claim 1 wherein:
   the ceramic material has the formula $Li_{6.25}La_{2.7}Zr_2Al_{0.25}O_{12\pm\delta}$, and δ is 0.125.

10. The electrode of claim 1 wherein:
    the dopant is selected from the group consisting of ions of Co, Mn, Cr, V, Ti, Mo, Ni, Cu, Zn, W, Bi, Sn, Pb, Cd, Sc, Y, Fe, and mixtures thereof.

11. The electrode of claim 1 wherein:
the dopant comprises cobalt ions.

12. An electrochemical device comprising:
a cathode comprising a lithium host material phase;
an anode comprising lithium metal, or a lithium host material phase;
a solid-state electrolyte configured to facilitate the transfer of ions between the anode and the cathode; and
a solid-state conductive material phase comprising a ceramic material having a crystal structure and a dopant in the crystal structure, the conductive material having a lithium-ion conductivity and an electronic conductivity wherein the electronic conductivity of the conductive material is greater than a reference electronic conductivity of a reference material comprising the ceramic material having the crystal structure without the dopant in the crystal structure, the conductive material filling at least part of at least one of a first structure of the lithium host material of the cathode or a second structure of the lithium host material of the anode,
wherein the dopant is selected from the group consisting of transition metal ions and mixtures thereof, and
wherein the cathode or the anode does not include a separate phase, other than the lithium host material phase and the solid-state conductive material phase, that provides an electrical pathway from a current collector to the lithium host material phase.

13. The electrochemical device of claim 12 wherein:
the ceramic material comprises an oxide including lithium, lanthanum, and zirconium, and
the crystal structure is a garnet-type or garnet-like crystal structure.

14. The electrochemical device of claim 12 wherein:
the lithium-ion conductivity is greater than $10^{-5}$ S/cm.

15. The electrochemical device of claim 12 wherein:
the dopant is present in the crystal structure at 0.05 to 3 weight percent based on a total weight of chemical elements in the crystal structure.

16. The electrochemical device of claim 12 wherein:
the conductive material electronic conductivity is greater than $10^{-6}$ S/cm.

17. The electrochemical device of claim 12 wherein:
the ceramic material has a formula of $Li_wA_xM_2Re_{3-y}O_z$
wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the crystal structure is a garnet-type or garnet-like crystal structure.

18. The electrochemical device of claim 12 wherein:
the ceramic material has the formula $Li_7La_3Zr_2O_{12}$.

19. The electrochemical device of claim 12 wherein:
the ceramic material has the formula $Li_{6.25}La_{2.7}Zr_2Al_{0.25}O_{12\pm\delta}$, and $\delta$ is 0.125.

20. The electrochemical device of claim 12 wherein:
wherein the dopant is selected from the group consisting of ions of Co, Mn, Cr, V, Ti, Mo, Ni, Cu, Zn, W, Bi, Sn, Pb, Cd, Sc, Y, Fe, and mixtures thereof.

21. The electrochemical device of claim 12 wherein:
the dopant comprises cobalt ions.

22. The electrochemical device of claim 12 wherein:
the conductive material fills at least part of the first structure.

23. The electrochemical device of claim 12 wherein:
the conductive material fills at least part of the second structure.

24. The electrochemical device of claim 12 wherein:
the lithium host material of the cathode is selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel, and
the conductive material fills at least part of the first structure.

25. The electrochemical device of claim 12 wherein:
the lithium host material of the cathode is selected from the group consisting of lithium cobalt oxides, and
the conductive material fills at least part of the first structure.

26. The electrochemical device of claim 12 wherein:
the lithium host material of the cathode is selected from the group consisting of lithium nickel manganese cobalt oxides, and
the conductive material fills at least part of the first structure.

27. The electrochemical device of claim 12 wherein:
the lithium host material of the cathode is selected from the group consisting of lithium nickel cobalt aluminum oxides, and
the conductive material fills at least part of the first structure.

28. The electrochemical device of claim 12 wherein:
the anode comprises the lithium host material of the anode,
the lithium host material of the anode is selected from the group consisting of graphite, lithium metal, lithium titanium oxides, hard carbon, tin/cobalt alloy, or silicon/carbon, and
the conductive material fills at least part of the second structure.

29. The electrochemical device of claim 12 wherein:
the anode comprises lithium metal.

30. The electrochemical device of claim 12 wherein:
the solid-state electrolyte comprises a solid electrolyte material selected from the group consisting of any combination oxide or phosphate materials with the garnet, perovskite, NaSICON, and LiSICON phase or polymers.

31. The electrochemical device of claim 30 wherein:
the solid electrolyte material has a formula of $Li_wA_xM_2Re_{3-y}O_z$
wherein w is 5-7.5,
wherein A is selected from B, Al, Ga, In, Zn, Cd, Y, Sc, Mg, Ca, Sr, Ba, Co, Fe, and any combination thereof,
wherein x is 0-2,
wherein M is selected from Zr, Hf, Nb, Ta, Mo, W, Sn, Ge, Si, Sb, Se, Te, and any combination thereof,
wherein Re is selected from lanthanide elements, actinide elements, and any combination thereof,
wherein y is 0-0.75,
wherein z is 10.875-13.125, and
wherein the crystal structure is a garnet-type or garnet-like crystal structure.

* * * * *